United States Patent Office 3,764,309
Patented Oct. 9, 1973

3,764,309
COLOR PRINTING METHOD
Yasuo Tamai, Masamichi Sato, and Satoru Honjo, Asaka-shi, Japan, assignors to Fuji Photo Film Co., Ltd., Kanagawa, Japan
Filed Dec. 2, 1968, Ser. No. 780,495
Claims priority, application Japan, Dec. 1, 1967, 42/77,139
Int. Cl. G03g 13/22
U.S. Cl. 96—1 R                          10 Claims

ABSTRACT OF THE DISCLOSURE

Color printing method comprising forming an electrostatic latent image on an insulating layer, converting the latent image into a material image utilizing a finely divided powder which comprises a material which easily absorbs a water-soluble dye from a solution thereof, fixing the material image and contacting the material image with a dye solution to absorb the dye into the material image. The absorbed dye is then transferred onto a dye-receiving sheet material.

BACKGROUND OF THE INVENTION

Field of the invention

This invention relates to a color printing method utilizing an electrostatic latent image formed by electrophotography or electrostatic electrophotography.

Description of the prior art

Among the many known methods for producing a multicolor image having high quality, a "combination" method in which silver halide emulsions and a color formation development are combined, is the most popular. A dye transfer method (dye imbibition method) based on the tanning development of a silver halide emulsion and employing the resultant gelatin reliefs has prevailed in some specialized fields, such as in the "Technicolor" process.

Although the "combination" method has wide application and is suitable for mass treatments, the resultant images do not illustrate sufficient fastness to light and to all chemical reagents. Contrary to the "combination" method, images having good light fastness and stability can be obtained by the transfer method. This method may be referred to as a printing, rather than strict photography. Therefore, the transfer method is profitable when a large number of duplicated prints are produced from a single original, but it is too costly for a small number of prints.

SUMMARY OF THE INVENTION

The present invention provides a novel method for producing color prints. The method basically comprises forming an electrostatic latent image on an insulating layer or a photoconductive insulating layer, converting the latent image into a material image utilizing a finely divided powder comprising materal which easly absorbs a water soluble dye, and then fixng the material image. The material image is then contacted with a dye solution which has been prepared by dissolving the dye in a solvent which consists primarily of water. The dye is then absorbed into the material image. The absorbed dye may then be transferred onto a dye-receiving sheet material by bringing the material image, carrying a dye absorbed thereon, into intimate contact with the dye-receiving sheet material.

Accordingly, an object of this invention is to provide a simple color printing method free from the above faults, by which high quality images can be obtained by the use of gelatin matrices prepared by rapid electrophotographic procedures.

Another object of this invention is to provide a color printing method based on electrophotography. From another point of view, it is an object of this invention to provide a new process for forming the matrix which is utilized in dye transfer color printing techniques.

Still further objects of this invention will be clear from the following description.

This invention is characterized by the following steps:

(1) forming an electrostatic latent image on the insulating layer of an electrophotographic recording element or an electrostatic recording element;
(2) converting said electrostatic latent image into a visible image by employing a finely-divided powder which easily absorbs an aqueous solution of a water soluble dye;
(3) fixing the resultant material image by any suitable method;
(4) absorbing a dye into said material image by bringing the image into contact with an aqueous solution of a water soluble dye, and
(5) placing a dye receiving sheet material to be dyed, having a surface which easily absorbs said dye solution when said dyed layer contacts said material image, whereby the dye transfers to the dyed layer to produce a final image on the material to be dyed.

Figure 1:
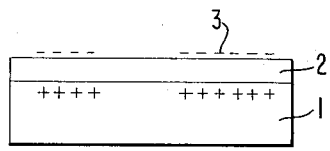
FIG. 1 is a cross-sectional view of an electrophotographic recording element on which an electrostatic latent image has been formed.

As stated, FIG. 1 is a sectional view of a recording element on which a latent image 3 is formed. The recording element comprises a semiconductive or conductive support 1 and an insulating recording layer 2. Though it may be unnecessary to explain the structure of such element since it is well known, it is preferable to exclude water soluble resins or hydrophilic resins in the insulating layer of this invention, since the recording element is dipped or contacted with an aqueous dye solution during subsequent operations. Further, when paper is used as the support, it is preferable to increase the water resistance of the support. An interlayer comprising a water soluble, highly conductive polymeric material, which is sometimes provided between the recording layer and paper substrate, should be excluded from a recording material for use in practicing the present invention. This is because if this layer dissolves in water or swells, the recording layer will easily fall off the support.

Of course, there is no trouble if only the surface is brought into contact with the treating solution without wetting the suport. In the case where the recording layer is a photoconductive insulating layer, the layer should preferably have a photoconductive response throughout the entire range of the visible spectrum, since color separation images can easily be formed from a multi-colored original by the use of suitable color separation filters. The preparation of such a layer is shown, for example, in U.S. Pat. 3,241,959, Kendall et al. The layer may also have a response in a limited range of the visible spectrum, or may have almost no response in the visible range. Such a recording layer can also be utilized for forming multicolor images by combination with color separation positives or negatives.

The electrostatic latent image can be formed by any known method. For example, as typical methods, one may follow the Xerographic process in which an image exposure is applied to a uniformly charge photoconductive insulating layer. Or the Kallman process may be utilized. This is a process in which the order of the exposure step and the charging step is reversed. A process for applying a charge pattern onto an insulating layer may also be used. A uniformly charged insulating layer may be subjected by imagewise exposure to infrared radiation instead of visible rays. Obviously, variations on the above can be practiced.

Figure 2:
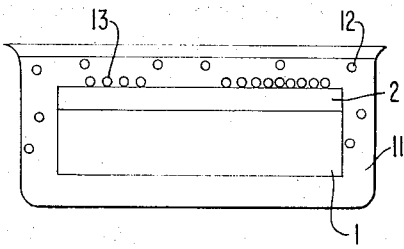
FIG. 2 is a schematic drawing which illustrates a step in the process wherein a visible image is produced by developing a latent image with a material which easily absorbs a dye solution.

FIG. 2 shows one example of the developing step which charges the latent image of negative polarity into a material image, wherein a liquid developed is employed. Since the latent image has a negative charge and the finely divided particles 12 have a positive charge, toner deposition occurs at charged area 3 by coulomb attraction. If a development electrode is employed, which has not been shown in the figures, a more faithful reproduction of a continuous tone image can be realized. 11 represents a carrier liquid of the liquid developer, and 13 represents an image consisting of deposited toner particles.

Repulsion development, wherein the polarity of the charge of the finely divided particles is similar to that of the latent image, may also be utilized in the present invention.

While any known method may be utilized for developing in the present invention, the most preferable result is obtained by liquid development.

The material image should be made from a water insoluble material which has a good affinity for the water soluble dye. The most preferable materials are polymers belonging to the class of hydrophilic polypeptides such as gelatin, casein, glue and albumin. Modified materials derived from these polypeptides, such as phthalated gelatin, may also be used. These materials are divided into particles having a particle size of 2-20 microns (by any suitable method) and are suspended in an insulating liquid.

The invention will now be illustrated for the case where, for example, gelatin is employed. A liquid developer including finely-divided particles of gelatin may be produced by crushing a mass of dried gelatin in an insulating liquid. As a means for obtaining finer particles of gelatin, one can prepare fine particles by adding acetone to an aqueous gelatin solution to cause phase separation, or else by spraying an aqueous gelatin solution into a dried hot air steam. Other materials may be similiarly pulverized. Since polypeptide-type polymers are generally positively charged in any insulating liquids, such as aliphatic hydrocarbons and fluorochlorinated hydrocarbons, it is generally not necessary to use additional charge control techniques. If it is desired to impart a negative charge polarity to polypeptide particles, the surface of the particles may be covered with a suitable thermoplastic resinous material as a charge controlling agent. Hardened polypeptides may also be used in the present invention.

Prior to dye imbibition into the toner image thus prepared, it is necessary to fix the image.

The following methods for fixing are exemplary of those which are suitable:

(1) Heat fixing; carried out by the use of a thermoplastic resin incorporated into a finely divided powder. Alternatively solvent fixing can be carried out by exposure to a solvent vapor which dissolves the thermoplastic resin.

(2) Fixing carried out by forcing the finely divided powder image into a surface of the thermoplastic insulating layer by softening the layer by heating.

(3) Fixing by softening the finely divided powder with high temperature steam.

Figure 3:
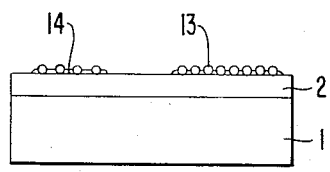
FIG. 3 is a cross-sectional view of the element of FIG. 1 on which the image has been fixed.

(4) Fixing by applying a "lacquer" coating to the image. The thickness of the "lacquer" coating should be sufficiently small so as to not prevent the transfer of a dye from the image to another sheet during subsequent operations. Numeral 14 in FIG. 3 represents a thermoplastic resin utilized for the fixing operation.

Figure 4:
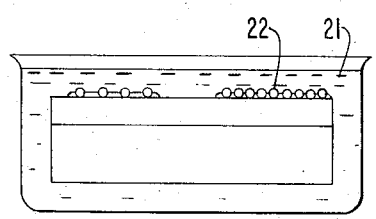
FIG. 4 schematically illustrates the step of absorbing the dye into the image-forming material by immersing the image-bearing record element in a dye solution.

The next step in the method is dyeing the material image. Referring to FIG. 4, the recording element which bears the image can be dipped into a dye solution. The dye solution may also be pushed onto the image surface by means of a wetting roller. The important point is that the surface be contacted with the dye solution. Since the insulating layer is hydrophobic, the background is not dyed when the solution is mainly composed of water. Preferable dyes for dyeing the polypeptides described above are acid and mordant dyes. Examples of these dyes include Cyan dyes as: (Color Index) Acid Blue 45, Acid Green 16, Acid Green 1, Acid Blue 1, Acid Blue 9 and Acid Blue 54.

Magenta dyes as: (Color Index) Acid Red 80, Acid Red 34, Acid Red 1, Acid Violet 19 and Acid Violet 7.

Yellow dyes as: (Color Index) Acid Yellow 23, Acid Yellow 11, Direct Yellow 12 and Acid Yellow 34.

These dyes are preferable because of their mordanting ability.

The dye which meets the criteria described above which is transferred to the element to be dyed does not diffuse or dissolve during the subsequent transferring step when producing a multi-color image. To obtain a one-color image, any water soluble, optical dye may be used.

Referring to FIG. 4, 21 is the dye solution and 22 shows the deep colored state of the material image formed by dye imbibition. Dye solutions useful for dye imbibitions are mainly composed of water, but organic solvents miscible with water, such as methanol, ethanol, acetone, etc. may be incorporated into the solution up to about 20 percent of the total volume of the solution.

Figure 5:
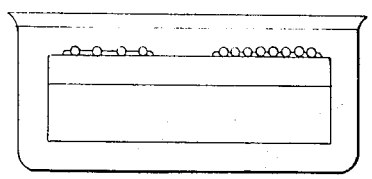
FIG. 5 represents the step of removing excess dye by immersing the element which had the dye absorbed thereon in a washing bath.

The dye absorbed into the material image is then transferred to a dye-receiving sheet material to be dyed. It is preferable to remove the excess dye prior to transfer in order to produce a high quality image. FIG. 5 represents a washing step suitable for this. When an acid dye is absorbed in the image, a weakly acidic washing bath is preferable, elution of the dye from the image being thereby controlled to be a minimum.

Figure 6:
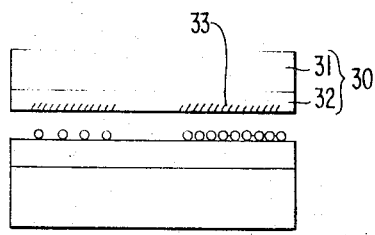
FIG. 6 is a schematic which represents transferring the dye from the image portion onto a dye-receiving layer of a sheet material which is to be dyed by bringing the material into intimate contact with the recording element which carried the dye-including image portion thereon.

FIG. 6 represents the step of transferring to the element to be dyed. The element to be dyed 30 comprises a support 31 and a dye-receiving layer 32 on the surface thereof. The latter may consist of polymers which are suitable for use as the toner material. The element to be dyed may be wet with an aqueous solution which includes a mordanting agent prior to contact with the image. 33 in the figure represents the dyed area.

By the above-described procedure, a monochromatic image may be produced on the element to be dyed. In addition, if dye images having different colors are superimposed in registration onto the element to be dyed, a multi-color image can be obtained.

The dye image thus obtained is characterized by excellent color quality as well as fastness to light. Deep colors are regenerated because of a high resolving power and freedom from surface reflection, when compared with images formed electrophotographically with differently colored toners. Further, since each color comprising the multi-color image is transparent, color "mixing" is complete, resulting in a very faithful reproduction of the colors present.

A number of printing sheets can be produced, since many images can be formed by repeated transfer of the dye with supplying the dye to the already formed image.

EXAMPLE I

A homogeneous coating solution was prepared by mixing 100 parts by weight of photoconductive zinc oxide, 20 parts by weight of the epoxy ester of dehydrated castor oil fatty acid and a small amount of toluene. Into the resulting mixture, 20/1000 parts of fluorescein and 20/100 parts of tetrabromophenol blue dissolved in a small amount of ethyleneglycol monomethyl ether were added, whereby the light response of the zinc oxide was extended to the entire visible range. After adding toluene thereto, the mixture was applied to a polyethylene terephthaltae film (thickness 90$\mu$) fixed on a surface of an aluminum sheet to form a film having an 8$\mu$ dried thickness. After drying in the dark, the resultant film functioned as an electrophotographic sensitive material.

A liquid developer was prepared as follows: A precipitate of a finely divided gelatin powder was prepared by adding, with stirring, acetone to a 5% aqueous gelatin solution at 40° C. The precipitate was separated from the mother liquor by a centrifugal separation, and washed by acetone. Then, the gelatin precipitate, moistened with acetone, was charged into an attritor (wet milling machine, produced by Mitsui Miike Co.) together with toluene and polystyrene, and blended for 30 minutes by milling. 1 part of the resulting paste (including the finely divided gelatin particles) was added to 200 parts of a carrier liquid comprising 95 parts of cyclohexane and 5 parts of linseed oil. A milky liquid developer was thus produced. The finely divided particles of gelatin had a positive charge in the solution. The added polystyrene served as a fixing agent for the image composed of the gelatin particles. A dye-receiving sheet material was prepared by providing a gelatin layer having a dried thickness of 4$\mu$ on the baryta surface of a standard photographic base paper.

The electrophotographic sensitive material described above was uniformly charged by exposure to a negative corona discharge in the dark. A color slide (as the original) was then charged in an enlarger. The negatively charged sensitive material was exposed to the light through a red filter placed on the slide.

After exposure, the sensitive material was wet with kerosene and dipped immediately into the above-described liquid developer, which was in a stainless pan, the pan serving as the developing electrode when the latent image surface was allowed to come near the bottom of the pan. After immersion for about 90 seconds, the material was removed and again washed with kerosense, and finally dried.

The image was then fixed by heating to a temperature of about 100° C. for a short period of time.

A gelatin relief image for a cyan print was thus obtained employing a blue filter.

In a similar manner, another sheet was exposed to the light through the same original using a green filter. Using the same developing treatment, a relief for a magenta print was obtained. A relief for a yellow print was obtained employed a blue filter.

These three matrices were then each dipped into aqueous solutions of the following Color Index: Acid Blue 54, Acid Violet 7 and Acid Yellow 23. The time of immersion was 2 minutes. They were then taken out and washed in a bath which contained acetic acid.

As an alternative, the dye-receiving sheet described above was immersed into an aqueous mordanting solution containing aluminum sulfate. The mordanted sheet was then brought sequentially into intimate contact in register with three relief images, whereby the dye absorbed in each of the toner images was transferred to the gelatin layer. A copy having an extremely good qualtiy was obtained. These relief images proved to be useable for about 100 process runs.

EXAMPLE II

This example differed from the first example only in that the gelatin relief images were hardened with a 10% methanol solution of formaldehyde. The results obtained were substantially comparable.

In addition to the preferred polypeptide polymers in the specification, any polymeric material which illustrates a high affinity for the water soluble dye can be utilized, preferably with the form of a fine powder, as indicated. Of course, the other requisites of the material which are recited must be met.

To further define the dyes which may be used in this invention, almost any basic dyestuff can be used to some degree, preferably those with application in other transfer or dye imbibition prcess, as in photography. One fault of the basic dyestuffs is that they illustrate poor durability. This can be rectified by selecting a dye which is capable of exhibiting mordanting characteristics in the proper environment.

Further, the photoconductive insulating layer heretofore described can be materials such as zinc oxide, cadmium sulfide and insulating resins. Reference should be made to U.S. Pat. 3,121,006, wherein suitable layers are described.

What is claimed is:
1. A color printing method which comprises:
   (a) forming an electrostatic latent image on a hydrophobic insulating layer,
   (b) converting said latent image into a material image by means of a finely divided powder comprising a hydrophilic material which is capable of absorbing a water-soluble dye from a solution thereof comprising a major proportion of water,
   (c) fixing said material image,
   (d) contacting said material image wtih a dye solution comprising a major proportion of water whereby dye is absorbed into said material image, and
   (e) transferring at least a portion of said absorbed dye onto a dye-receiving material by bringing said material image into contact with said dye-receiving material.

2. The method of claim 1 wherein said material image is formed from a material selected from the group consisting of water insoluble hydrophilic polypeptides and water insoluble hydrophilic modified polypeptides.

3. The method of claim 2 wherein said hydrophilic polypetide is selected from the group consisting of gelatin, casein, glue, and albumen.

4. The method of claim 2 wherein said modified hydrophilic polypeptide is phthalated gelatin.

5. The method of claim 1 wherein said electrostatic latent image is converted into said material image by contact with a liquid developer.

6. The method of claim 1 wherein said dye is selected from the group consisting of acid dyes and mordant dyes.

7. The method of claim 6 wherein said dye is utilized in the form of a solution comprising at least 80% water and up to about 20% of the total volume of an organic solvent miscible with water.

8. The method of claim 1 wherein said finely divided powder which is utilized to form said material image has a particle size within the range of from about .2 to about 20 microns.

9. The method of claim 8 wherein said finely divided particles are suspended in an insulating liquid and applied to said latent image to thereby convert said latent image into a material image.

10. The method of claim 1 where said dye-receiving material is a wetted gelatin transfer sheet.

References Cited

UNITED STATES PATENTS

| | | | |
|---|---|---|---|
| 2,297,691 | 10/1942 | Carlson | 96—1 |
| 3,003,891 | 10/1961 | Albrecht | 117—17.5 |
| 3,060,052 | 10/1962 | Martin | 117—17.5 |
| 3,357,830 | 12/1967 | Bixby | 96—1.2 |

CHARLES E. VAN HORN, Primary Examiner

U.S. Cl. X.R.

117—17.5, 37 LE; 101—464, 466; 252—62.1